United States Patent
Jha et al.

(10) Patent No.: US 10,872,120 B2
(45) Date of Patent: Dec. 22, 2020

(54) VISUALIZING DATA CENTER INVENTORY AND ENTITY RELATIONSHIPS

(71) Applicant: Vmware, Inc., Palo Alto, CA (US)

(72) Inventors: Chandrashekhar Jha, Bangalore (IN); Kumar Gaurav, Bangalore (IN); Sushil Verma, Bangalore (IN); Vishal Gupta, Bangalore (IN); Aditya Gopisetti, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 271 days.

(21) Appl. No.: 15/995,109

(22) Filed: May 31, 2018

(65) Prior Publication Data

US 2019/0370414 A1 Dec. 5, 2019

(51) Int. Cl.
*G06F 16/904* (2019.01)
*G06F 16/28* (2019.01)
*G06F 16/901* (2019.01)

(52) U.S. Cl.
CPC .......... *G06F 16/904* (2019.01); *G06F 16/284* (2019.01); *G06F 16/9027* (2019.01)

(58) Field of Classification Search
CPC .. G06F 16/904; G06F 16/284; G06F 16/9027; G06F 16/951
See application file for complete search history.

(56) References Cited

U.S. PATENT DOCUMENTS

| | | | | |
|---|---|---|---|---|
| 8,838,578 B2* | 9/2014 | Yoon | .................... | G06F 16/2453 707/718 |
| 8,868,485 B2* | 10/2014 | Meeks | .................. | G06Q 10/06 707/602 |
| 2012/0096134 A1* | 4/2012 | Suit | ..................... | H04L 12/6418 709/221 |
| 2012/0131161 A1* | 5/2012 | Ferris | .................... | G06Q 30/02 709/223 |
| 2012/0216135 A1* | 8/2012 | Wong | .................. | G06F 9/45508 715/764 |

(Continued)

OTHER PUBLICATIONS

Sun et al., Optimizing Resource Utilization of a Data Center, 2016, IEEE, all pages. (Year: 2016).*

(Continued)

*Primary Examiner* — Jay A Morrison
*Assistant Examiner* — Antonio J Caiado
(74) *Attorney, Agent, or Firm* — Clayton, McKay & Bailey, PC

(57) ABSTRACT

A system can provide a visual representation of an inventory of data entities for a distributed computing system. Inventory data including cost and operational data for data entities such as data centers, servers, and virtual machines, can be converted into a format file. The format file can be used to create a tree of nodes and node summaries corresponding to the data entities. A user interface can display hierarchical and isolated views of the tree revealing parent child relationships between data entities within a computing system infrastructure. Node summaries including cost and utilization data can be displayed to reveal how specific sub-costs such as labor and licensing, are driven by data entities in one level of the infrastructure and pushed to respective parent or child data entities in other levels. Views of the tree can be used to determine areas of inefficiency or reduced value within the computing system.

17 Claims, 11 Drawing Sheets

(56) References Cited

U.S. PATENT DOCUMENTS

2013/0185433 A1* 7/2013 Zhu .................... H04L 43/0882
 709/226
2017/0148044 A1* 5/2017 Fukuda .............. G06Q 30/0206
2019/0025991 A1* 1/2019 Bonchev ............... G06F 3/0653
2019/0087389 A1* 3/2019 Ranjan ................ H02J 13/0003

OTHER PUBLICATIONS

Li et al., The Method and Tool of Cost Analysis for Cloud Computing, IEEE, all pages. (Year: 2009).*

* cited by examiner

VISUALIZING DATA CENTER INVENTORY AND ENTITY RELATIONSHIPS

BACKGROUND

Enterprises commonly utilize distributed computing systems to support enterprise-level management, communications, data storage, and applications. A distributed computing system that shares data processing, memory, storage, and other computing resources across an enterprise can be provided by an infrastructure of networked data entities. Example data entities can include data-storage systems, communications routers, network appliances, tablet computers, mobile telephones, as well as physical and virtualized computers, servers, server clusters, and data centers. Virtualized data entities can be provided through cloud-based computing services.

An infrastructure for a large distributed system can include an inventory of data entities interconnected by local networks, wide-area networks, wireless communications, and the Internet. Data entities can be connected in parent-child relationships that collectively define a hierarchy of an infrastructure. For example, data centers can support servers that support and manage groups of remote computers or virtual machines used by end-users. Public or private clouds can make up parts of an infrastructure and expand it by instantiating virtualized machines at different levels of a respective hierarchy. Further, clouds can be used to shift allocated computing resources between data entities and levels of the hierarchy.

Enterprises need to know resource utilizations and costs to maximize the efficiency and reduce the cost of their computing systems. Because of complexity of cloud-based datacenters, these can be complicated determinations. Relationships between the many data entities are often complex. Additionally, the cost of a particular data entity can include sub-costs for storage, memory, processing power, hardware, labor, and licensing. Some sub-costs for a data entity can actually originate from other related data entities.

Tracking utilizations and sub-costs for large distributed computing systems can require substantial time and resources. A bottom up accrual or a top down distribution calculation may be required to determine that sub-cost for a particular data entity. For example, in a hierarchy with a data center that supports several servers that each support a group of VMs, licensing of software may only occur on the VM-level. Therefore, licensing costs for the data center can be calculated bottom up by summing licensing costs of the VMs for each server, then summing the totals of the servers. On the other hand, the cost to provide a single VM must include top down costs. For example, VM costs necessarily include a portion of labor performed at the data center level. Accordingly, a top down cost distribution for the VM can include a labor cost for the data center divided by the number of servers it supports, divided by the number of VMs supported by a server supporting the VM in question.

Current systems do not present this information in a manner that allows an administrator to appreciate how data entities are interconnected and pinpoint what drives particular costs at different levels of a hierarchy. Instead, enterprises are left to solve these problems based on a collection of separate reports with isolated utilization and cost parameters. As a result, many enterprises struggle to form a complete picture of where sub-costs originate or how they are distributed between levels of a data center hierarchy. This leads to significant costs for the enterprise and inefficient data center infrastructure.

Therefore, a need exists for systems and methods that visualize data center costs and data entity hierarchies. A need also exists for an improved graphical user interface that can display how resource utilizations and costs are distributed in a data center hierarchy.

SUMMARY

Examples described herein include systems and methods for visualizing an inventory of data entities ("inventory"). In one example, inventory data including cost and utilization data for data entities of an infrastructure can be converted into a format file. For example, operational and cost data collected and calculated by a backend financial service can be encoded in the format file into a self-describing language such as XML, HTML, or JSON by an inventory data service of the backend. The format file can be used by to create a tree structure ("tree") of nodes that correspond to the data entities, and to populate corresponding node summaries with inventory data.

In one example, the tree can be provided to a User Interface ("UI"), which in turn can display a first view of the inventory. The first view can include a hierarchical view of the inventory, which includes a portion of the tree and a first inventory summary. The tree can model the interconnections between data entities in the infrastructure. As a result, in one example, the hierarchical view can show the data entities arranged in levels of a hierarchy. The hierarchical view can also illustrate parent child relationships between data entities to show how certain data entities support or are supported by other data entities in the infrastructure.

A review pane of the UI can display the first inventory summary contemporaneously with at least one data entity displayed in the hierarchical view. The first inventory summary can include at least one node summary corresponding to a displayed data entity. The node summary can include cost and utilization data. Further, the node summary can have multiple cost or utilization components and cost flow components that reveal which data entities drive particular costs. In another example, the node summaries can indicate a status of a data entity as active, idle, or deleted. In another example, the status can correspond to a status associated with a majority of child data entities of a selected node (representing a parent data entity).

In one example, nodes displayed in a UI can be selected in multiple ways. In one example, a first type of selection causes children nodes to expand from the selected node and reveal supported data entities in an updated hierarchical view of the inventory. A selected parent node can be connected to its children nodes by a link. In one example, each of the children nodes can be connected to the parent node by an edge of the link. Edge sizes or colors can indicate relative values for characteristics of the children nodes. For example, the edges can be sized in proportion to cost so that in a group of children data entities, the higher costing data entities will have thicker edges relative to the lower costing data entities. Accordingly, a user can compare cost between data entities through a single view of the UI.

In another example, a second type of node selection can be performed. For the second selection type, node summaries for the selected node and its ancestor nodes can be displayed within the tree and in a review pane. A second inventory summary can be used to view node summaries in isolation and within a context of a line of data entities. This can allow a user to glean how one data entity contributes to a tracked parameter for a supporting entity in a single view.

In another example, the UI can include a search field that can be used to enter a search query for a data entity in the infrastructure. In one example, the user can select a search result from a single result or a list of results. The UI can display a second view of the inventory including an isolated view of the tree and a first inventory summary corresponding to the selected search result. This isolated view can include a string of nodes including a node for a selected data entity corresponding to the search result selection. The node for the selected data entity can be displayed at the end of the string of nodes. The displayed string of nodes can represent data entities that support the selected data entity. The nodes can be arranged in an ancestral order, such that the children nodes that link to the selected data entity are displayed for the ancestor nodes. In one example, where selected data entity supports other data entities, a first type of node selection can be executed and children nodes can be expanded in the isolated view from the node for the selected data entity.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for visualizing an inventory of data entities for an infrastructure of a computing system. Inventory data including cost and utilization data for the data entities can be converted into a format file and the format file can be applied to a framework. Application of the format file can create a tree of nodes that correspond to the data entities, and node summaries with corresponding inventory data. The tree can be provided to a User Interface (UI) which in turn can display a first view of the inventory that includes a hierarchical view and a first inventory view. The hierarchical view can include a portion of the tree and reveal interconnections between data entities within a structure of a hierarchy. The first inventory summary can include a node summary in a review pane of a UI for a displayed data entity.

The user can make selections on the UI to expand and collapse the tree structure to focus on different levels or nodes. Contemporaneously displayed node summaries can update accordingly to correspond to a selected portion of the tree. A first type of node selection can expand children nodes from parent nodes to view more portions of the tree. A second type of node selection causes node summaries for a selected node and its ancestors to display in the tree and the review pane. The node summaries can include a total cost for a data entity and sub-costs, for example, for memory and storage. Utilization data regarding the data entity's usage of certain computing resources can be included also. The node summaries can include cost flow components that show where a particular sub-cost comes from in a hierarchy relative to a data entity for the selected node.

Figure 1:
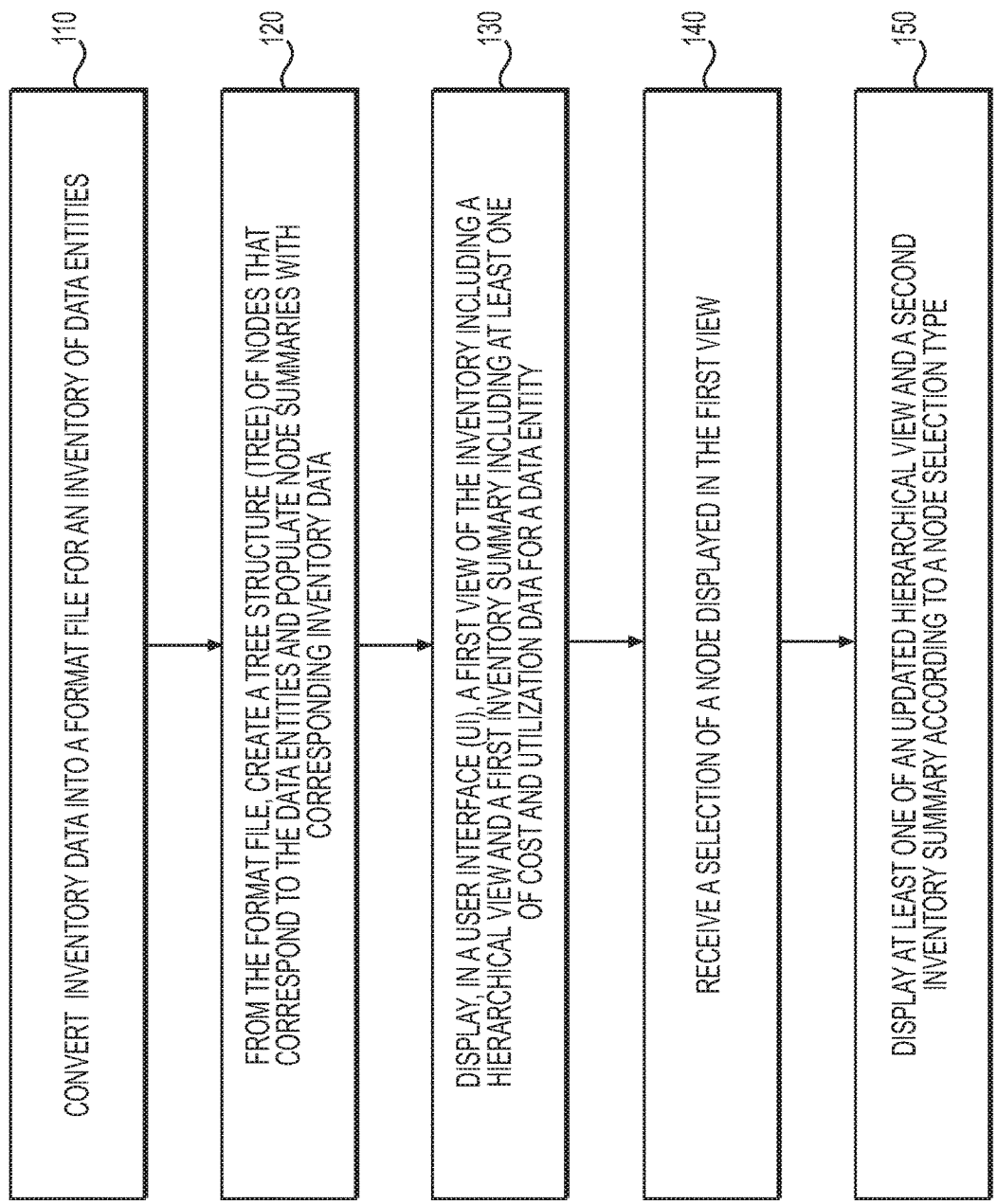
FIG. 1 is a flowchart of an exemplary method for visualizing an inventory of data entities.
Figure 2:
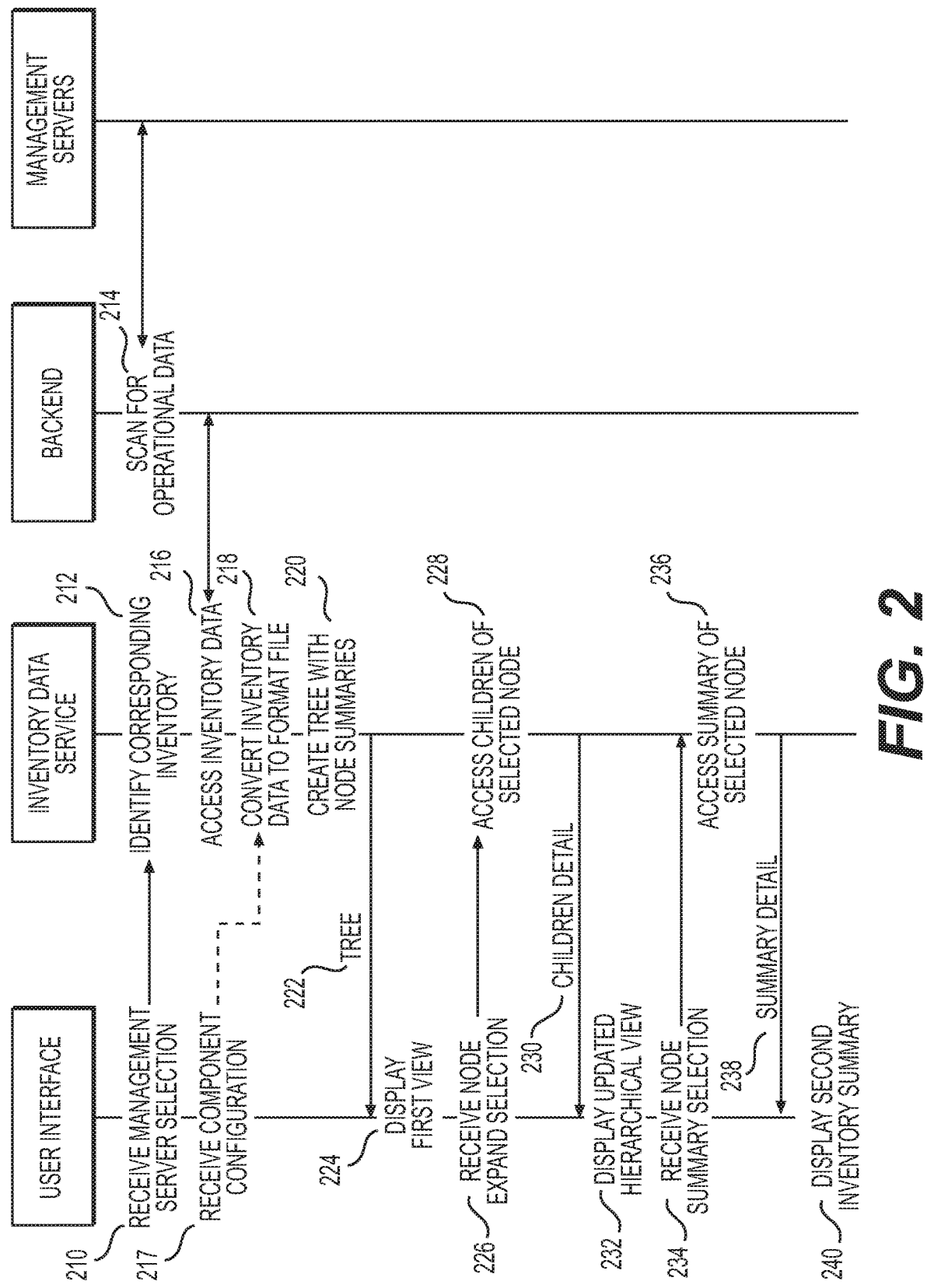
FIG. 2 is a sequence diagram of an exemplary method for visualizing an inventory of data entities.
Figure 3:
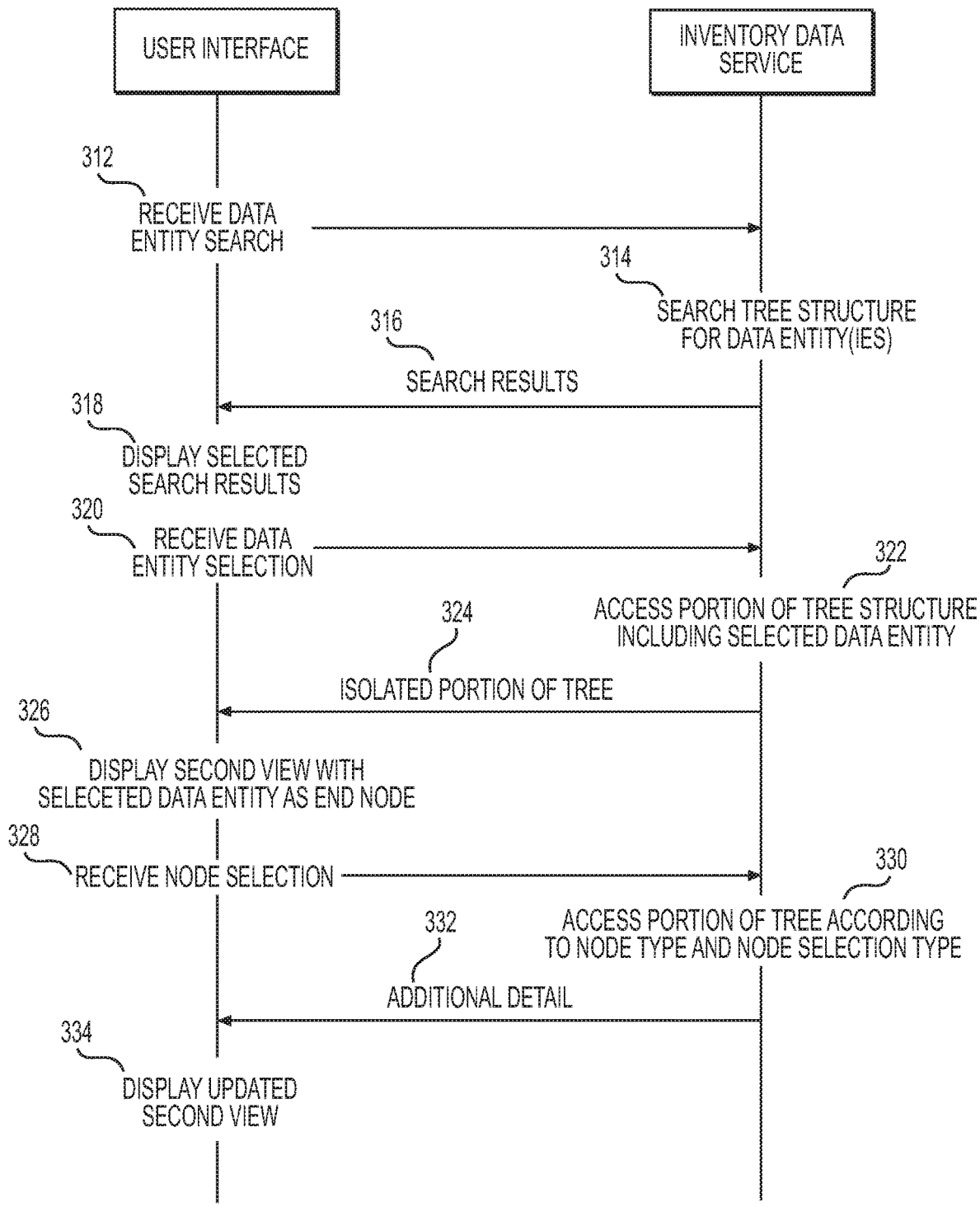
FIG. 3 is a sequence diagram of an exemplary method for searching for a data entity with a UI.
Figure 4:
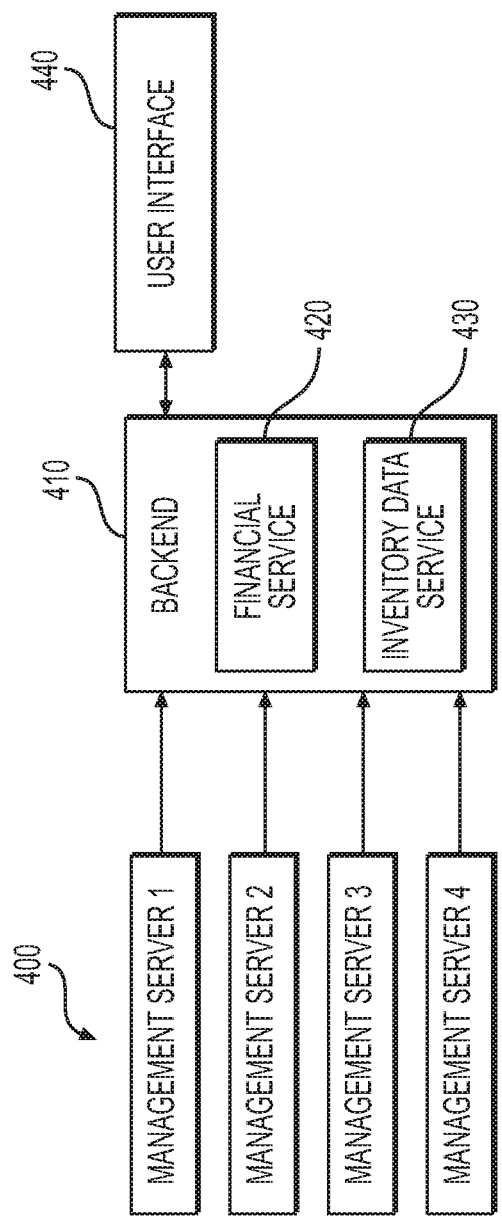
FIG. 4 is an exemplary illustration of system components for visualizing an inventory of data entities.
Figure 5A:
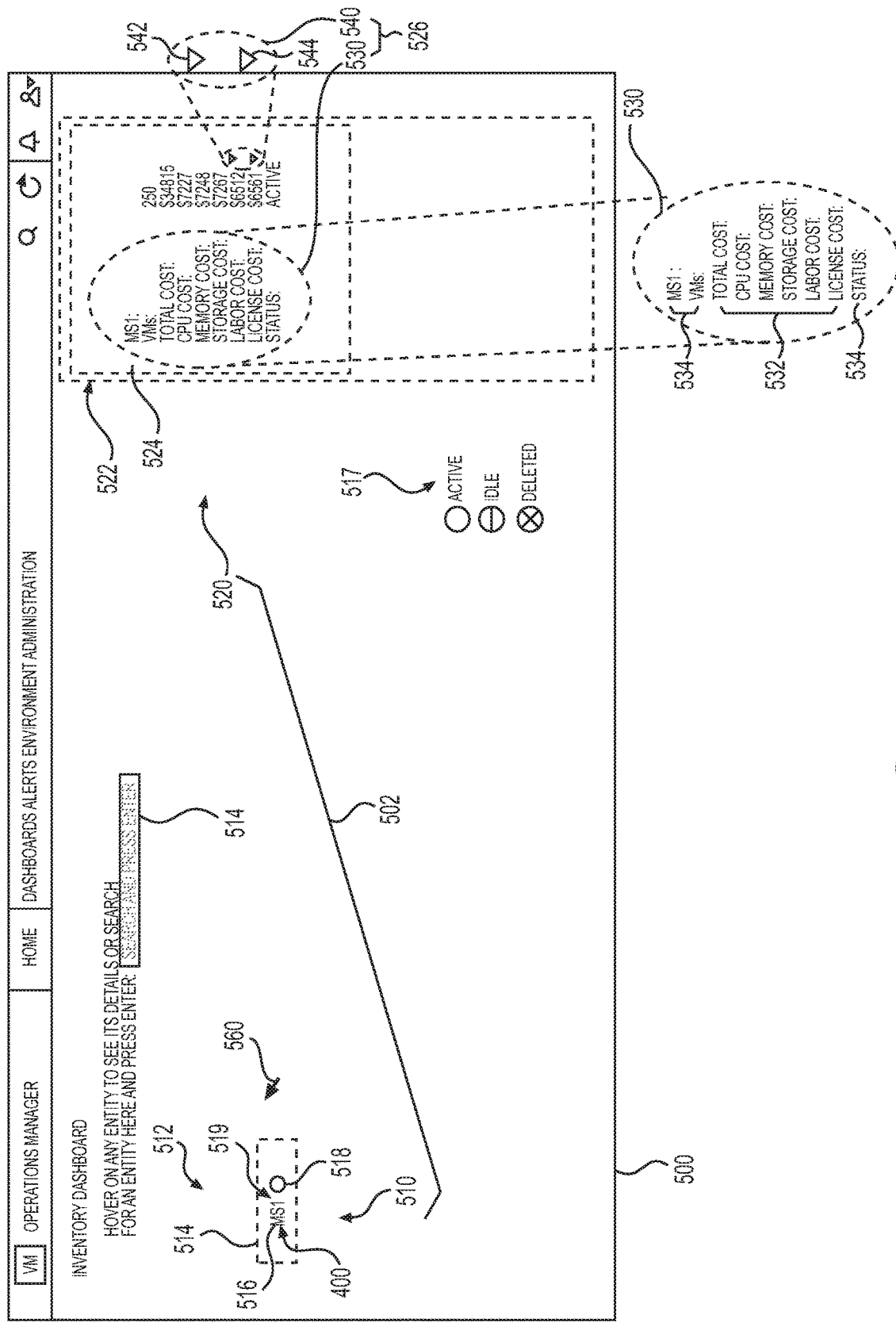
FIGS. 5A and 5B illustrate an exemplary UI for visualizing an inventory of data entities.
Figure 5B:
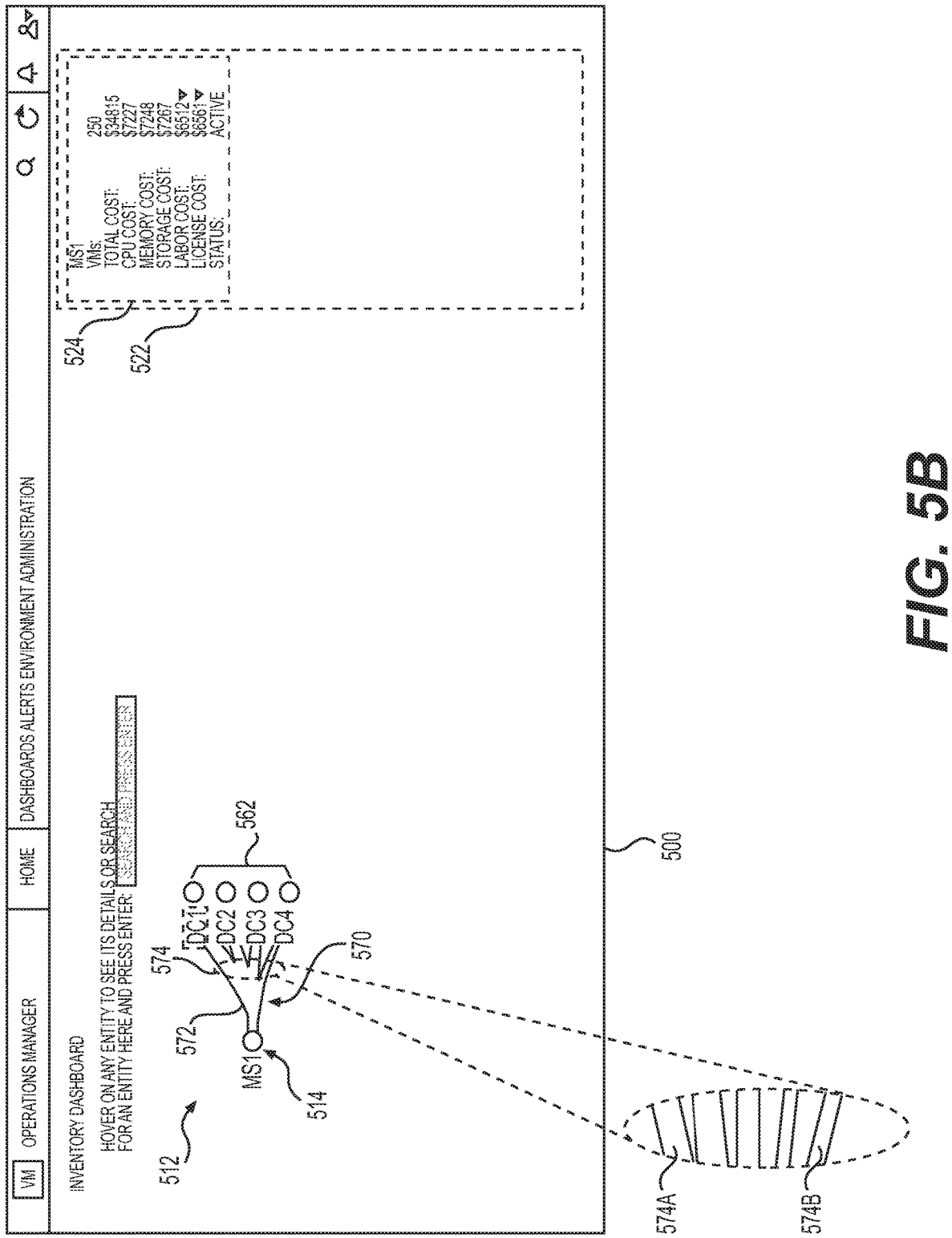
Figure 6A:
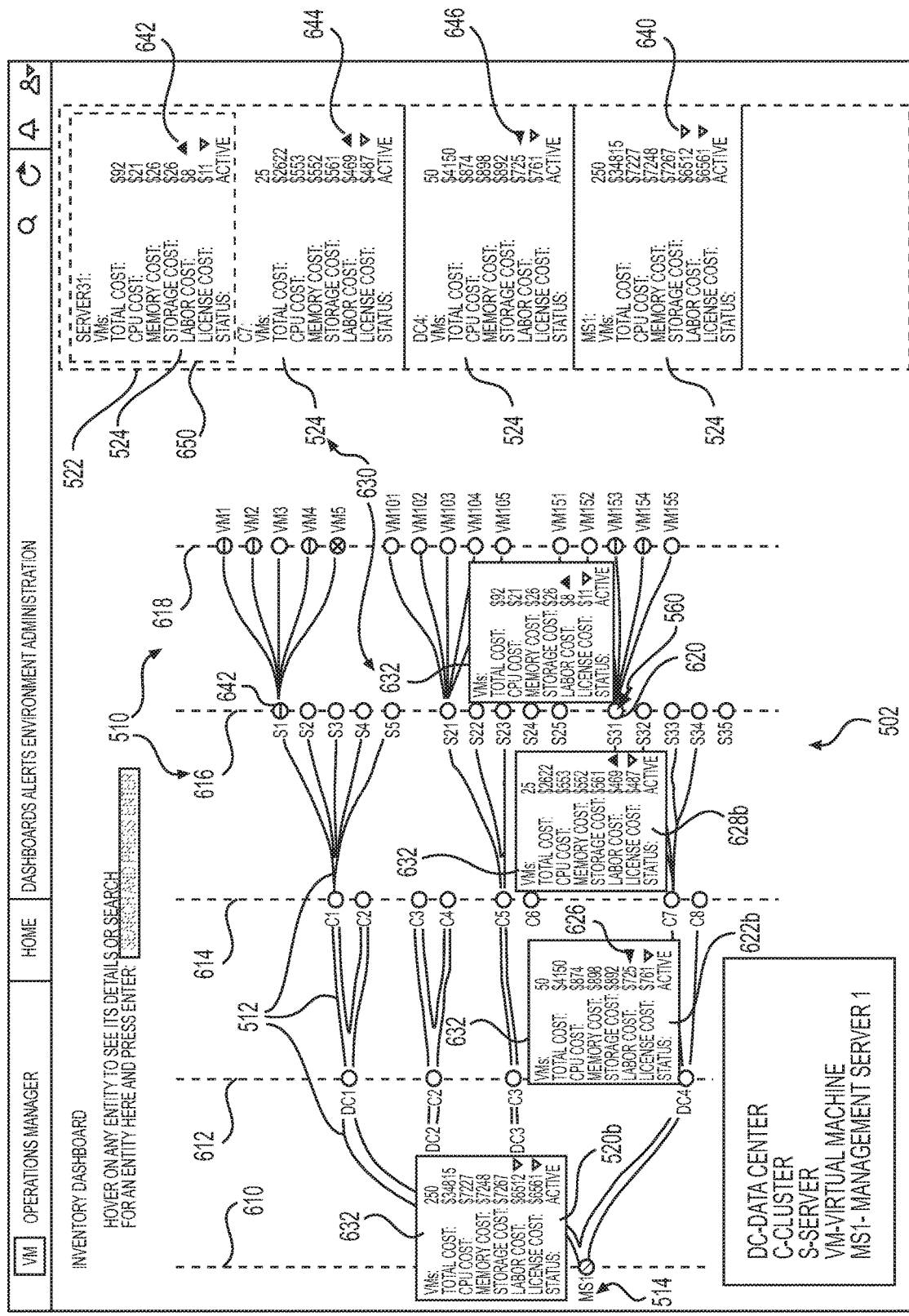
FIGS. 6A and 6B are illustrations of an exemplary UI displaying one type of an inventory summary.
Figure 6B:
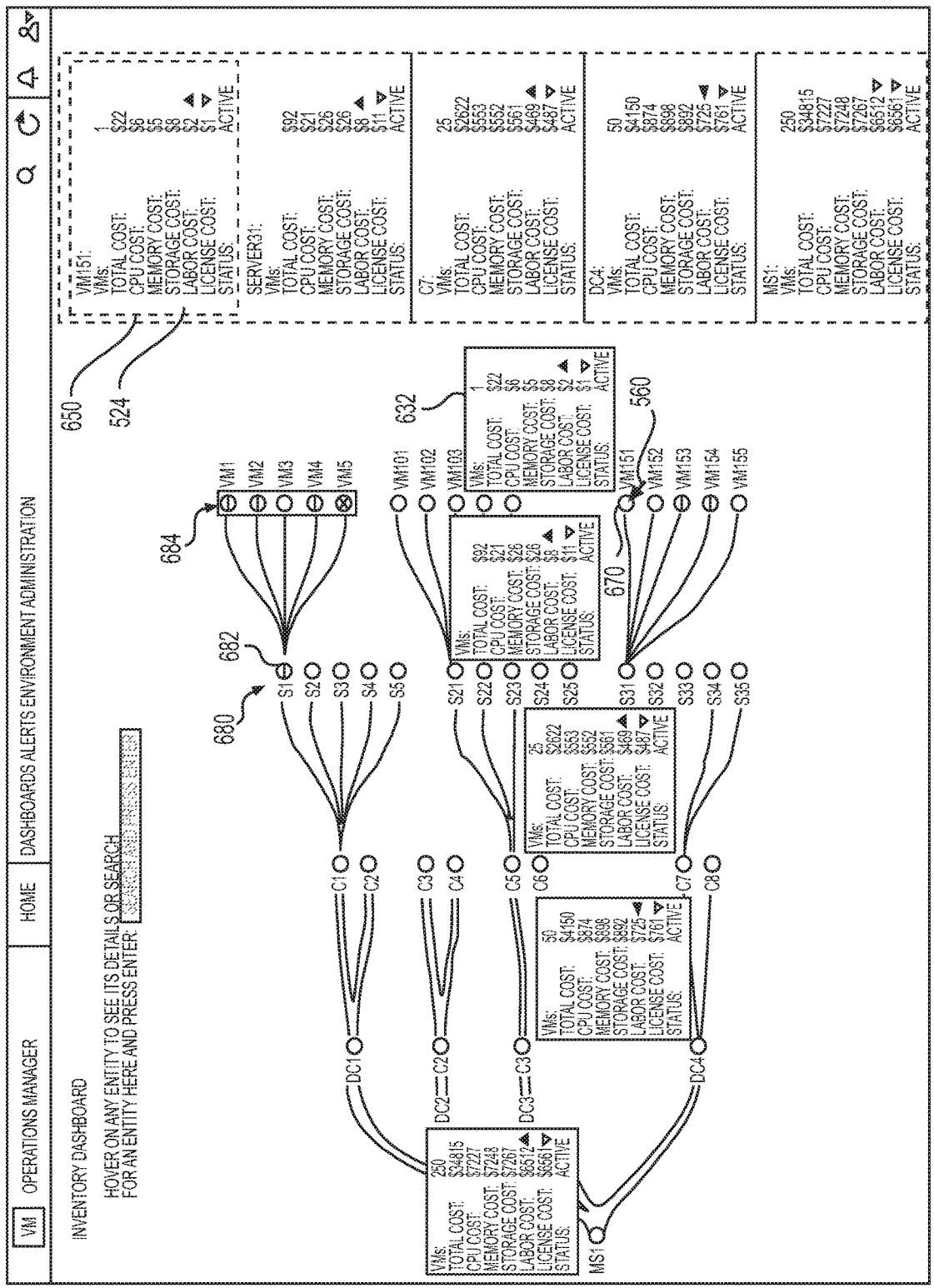
Figure 7:
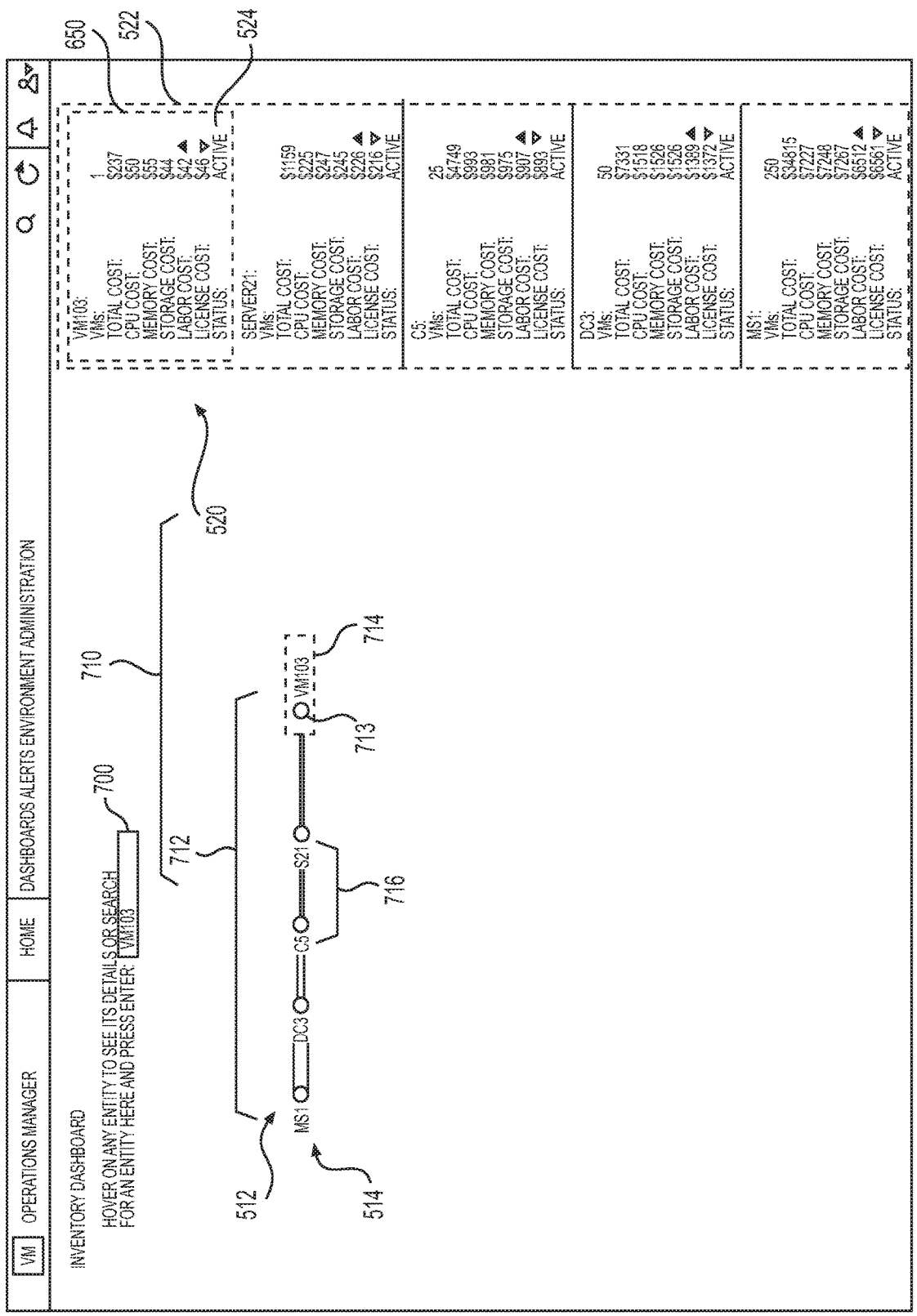
FIG. 7 is an illustration of an exemplary UI including a search result for a directed data entity search.
Figure 8A:
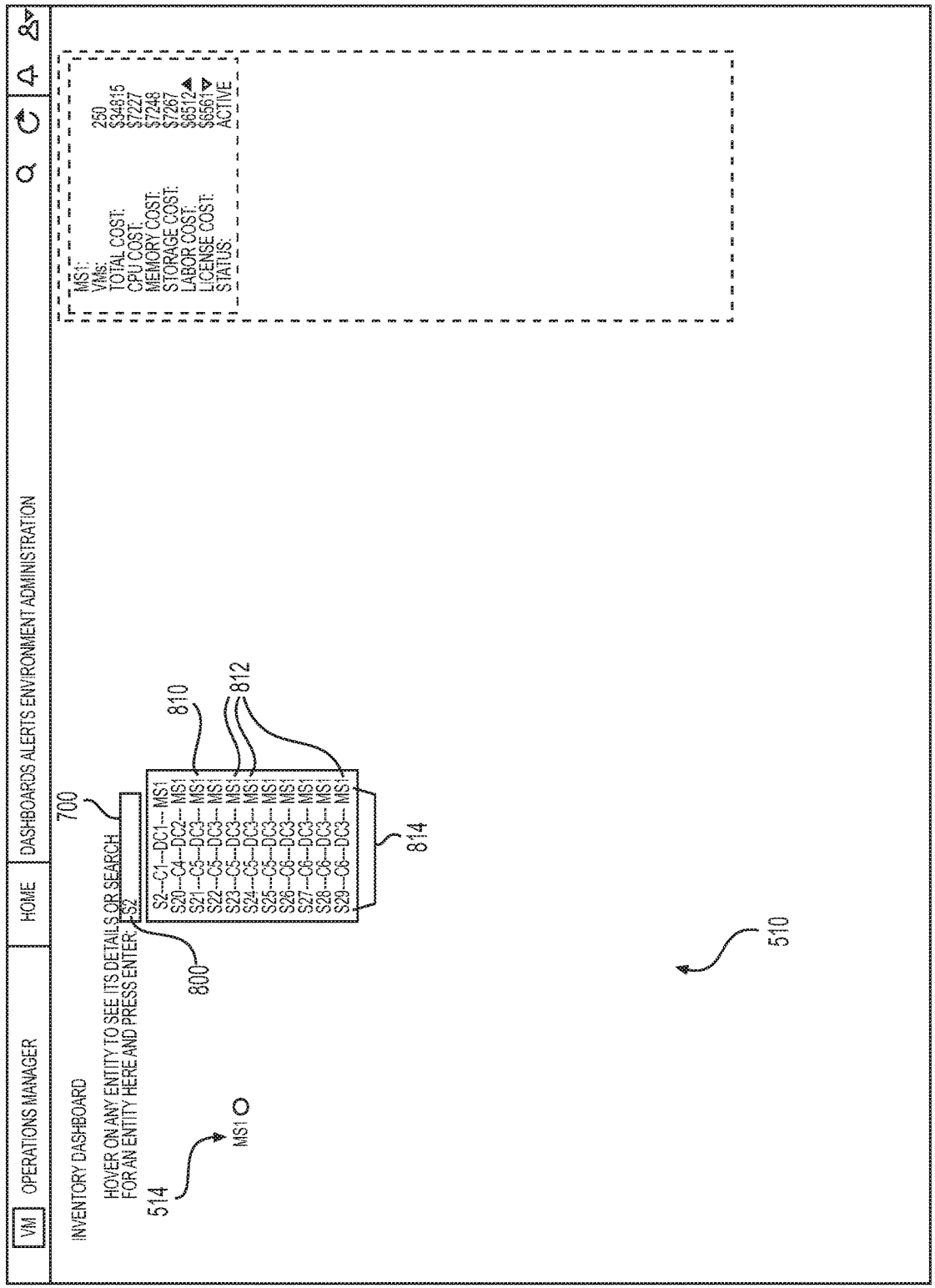
FIG. 8A is an illustration of an exemplary UI for a menu-based data entity search.
Figure 8B:
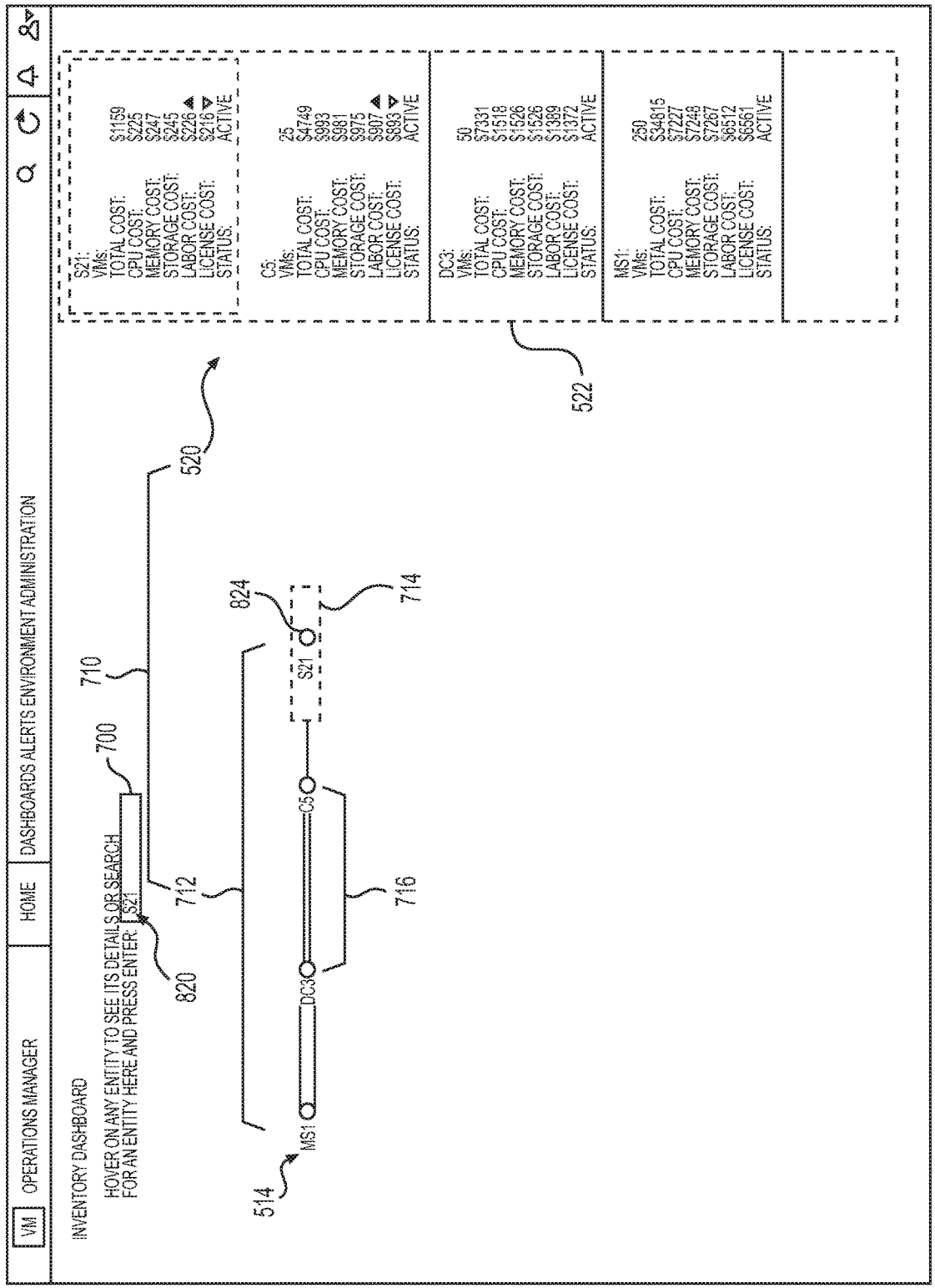
FIG. 8B is an illustration of an exemplary UI including a search result for a menu-based data entity search.

FIG. 1 provides a flowchart of an example method for visualizing an inventory of data entities and obtaining data entity specific cost or utilization data. FIG. 2 provides a more detailed sequence diagram for the method of visualizing an inventory of FIG. 1. FIG. 3 provides a detailed sequence diagram for using a UI to search for a data entity within an inventory and obtain respective cost or utilization data. FIG. 4 provides an illustration of an example system for performing the methods of FIGS. 1-4. FIGS. 5A and 5B provide illustrations of an exemplary UI displaying a first view of an inventory that includes a hierarchical view of the inventory and a first inventory summary. FIGS. 6A and 6B provide illustrations of an exemplary UI in which an option to view a second inventory summary for different specific data entities has been selected. FIG. 7 provides an illustration of an exemplary UI displaying a second view of an inventory subsequent to an execution of a directed entity search. FIGS. 8A and 8B provide illustrations of an exemplary UI before and after a menu-based entity search has been executed.

Turning to the flowchart of FIG. 1, stage 110 includes converting inventory data into a format file. The inventory data can include cost and utilization data for an inventory of data entities ("inventory"). An inventory encompasses interconnected data entities that make up an infrastructure of a computing system. Portions of the infrastructure can be provided by a cloud computing system and exist in a private or public cloud. In one example, an inventory can include one or more management servers, data centers, clusters, servers, and user devices or virtual machines ("VM" or "VMs") implemented on user devices.

A VM can be a virtualization of a physical computing system or device. For example, the VM can be configured to simulate an embedded operating system that supports multiple applications. In one example, a VM is a virtualization of a user device such as a laptop, a mobile device, or other computing device. In another example, a VM can be a virtualization of a server or a data center. Any of the data entities in an inventory can be interchanged with network or storage components incorporated within a hierarchy of an infrastructure.

The inventory data can include operational information regarding the physical or virtual data entities of a respective entity inventory. With respect to servers or VMs, for example, the inventory data can include names and locations, physical hardware if applicable, current and historical loads, installed software, the number of VMs running on each server, OS type, OS license type, and software specifications for each server. The inventory data can include information defining how data entities are interconnected.

For example, inventory data for a server can identify a cluster the server is grouped in and the VMs the server maintains.

The inventory data can further include storage and memory allocation data and an indication of operational status for each data entity. In one example, a status for a data entity can be active, idle, or deleted. Using VMs as an example, an active status can include a VM that is currently being implemented on a user device and operating in a normal state. An idle status can correspond to a VM that is being actively maintained on a server but not currently being implemented on a user device. A deleted status can correspond to a VM that has been deleted, is marked for deletion, or persists in a state on a server from which it must be restored.

The cost and utilization data included in the inventory data can include, but is not limited to, hardware cost, OS and other software licensing costs, memory costs, storage costs, labor costs to install, repair, and maintain servers, and facility costs such as rent, real estate, power, and cooling. The cost and utilization data can also include allocation percentages for memory, storage, and processing power with respect to total allocations for groups of VMs, servers, and clusters. In one example, the utilization data can further include percent usage of individual data entity allocations for storage, memory, and processing power.

The inventory data can be obtained and converted by backend services of a management platform. In one example, a backend financial service can collect operational data and compute costs. Examples of financial services include VMWARE VREALIZE Business ("vRB") and VREALIZE Business for clouds ("vRBC"), as well as others. These services can take input from a VCENTER, VREALIZE Automation, or VCLOUD Director deployed by an administrator for managing a respective environment. In one example, vRB and vRBC can inventory structure information from VREALIZE Operations, along with VM and storage utilizations. The data center inventory structure can include servers, clusters, VM, storage details, etc. In addition, the VM and storage utilizations can be collected for given time intervals and aggregated for a longer time interval. Using the collected data, vRB, vRBC, or another financial service can output costs incurred on VMs deployed in the environment.

The inventory data can be converted into the format file in stage 110 by a backend inventory data service. In one example, the format file includes the inventory data encoded in a self-describing language such as XML, HTML, or JSON. During a conversion process, data elements collected by a financial service and corresponding to data entity identifiers, associations, and utilizations, can be assigned to specific objects created within the format file by the inventory data service. Further, the inventory data service can assign specific objects to costs previously computed by the financial service.

At stage 120, the method can include creating a tree structure ("tree") of data entity nodes ("nodes") from the format file. Further, node summaries for the nodes can be populated with corresponding inventory data from the format file. In one example, the tree is a horizontal tree that can include a root node and one or more levels of descendant nodes to the right or the left of the root node. In another example, the tree is a vertical tree with levels of descendant nodes above or below the root node.

Each level of the tree can include one or more nodes that correspond to data entities of a particular type. A node on one level can be a parent node linked to a respective group of children nodes in a next level. The parent node corresponds to a data entity that supports a group of data entities, for example a data center that maintains a cluster of servers within an infrastructure.

The tree is a visual representation of the inventory and can be created by applying the format file to a framework. In one example, the framework can include a library of pre-written scripts that can be utilized to produce a graphical representation of the inventory. In one example, the library can be a JavaScript library such as D3.js. Accordingly, the framework can produce the tree as a dynamic, interactive data visualization that is implemented in a web browser. The format file can be coded to a particular framework and include references to defined elements in a respective library. In applying the format file, the framework can recognize the references and create objects that correspond to data entities in the inventory. These objects can be expressed as nodes. The framework can instantiate a node summary for each node created. Each node summary can be populated with inventory data for a data entity that corresponds to a respective node associated with the node summary. The inventory data can be extracted from the format file and used by the framework to populate the node summaries.

Stage 130 of the method can include displaying a first view of the inventory in a UI. The UI can receive the tree and render the first view in a display of a computing device implementing the UI. The first view can include a hierarchical view and a first inventory summary. The hierarchical view is a view of all or part of the tree and includes at least a root node for a data entity at the highest level of a hierarchy. In one example, the hierarchical view displayed in stage 130 can include one or more levels of descendant nodes. The number of levels displayed in an initial hierarchical view can be preset or set by a user of the UI. For each level displayed, all nodes for that level will be included in the hierarchical view.

Further, links between levels will be included in the hierarchical view to illustrate respective child-parent relationships for all of the nodes in the levels displayed. A link between a parent node and its children nodes can have edges for each child node connecting it to the parent node. The edges can be sized proportionally according to a value of one component, for example total cost, for each of the children nodes. Accordingly, a user can quickly see which supported data entity has the highest cost.

The first inventory summary can include a node summary for a node displayed in the initial hierarchical view. In one example, the node summary is a node summary for the root node. In another example, the first inventory summary can include a node summary for another node that is pre-selected by a user. The first inventory summary can include at least one of cost and utilization data for a data entity for the node and be displayed in a review pane of the UI. Cost data can include a total cost to maintain a data entity as well as one or more components of the total cost. In one example, the node summary can include the total cost for the data entity and a respective component cost for memory, labor, or licensing.

Utilization data may be included in the first inventory summary instead of, or in addition to, the cost data. The utilization data can include a percent of an allocated resource that is being used by a particular data entity. For example, a data entity may be allocated 1 GB of memory, but only be using half of this memory capacity. The utilization data can also include total allocations for the various resources that are tracked by the financial service.

At stage 140, the method can include receiving a selection of a node displayed in the first view of the inventory. The selection can be received through a user device. The user device may include any computing device that is provided with a display and can receive input from an operator, such as a tablet, phone, laptop, or computer.

According to an aspect of the present disclosure, one of two types of node selections can be received at stage 140. A first type can include a node being accessed in order to expand the node and display its respective children nodes. In one example, the node can be accessed by moving a pointer over the node in a display and clicking on a mouse device or entering a key on the keyboard. In another example, the node can be accessed by tapping a portion of a touch screen where the node is displayed. A second type of node selection can include polling a node by mouseover or otherwise causing a pointer to hover over the selected node. This second node selection type can cause the UI to display a respective node summary adjacent to the selected node.

Stage 150 of the method can include displaying at least one of an updated hierarchical view and a second inventory summary according to a type of node selection. An updated hierarchical view can be displayed when the first type of node selection type is performed on a node that includes children nodes. The updated hierarchical view can include the tree as previously displayed plus the children nodes of the selected node. Further, a link between a level of the selected node and a level of the children nodes can be displayed in the updated hierarchical view. Repeating the first node selection type for all nodes having children and being displayed in successive updated hierarchical views can cause the UI to reveal an entire tree.

A second inventory summary can be displayed when the second node selection type is performed on any of the nodes displayed in the first view. As previously discussed, the first inventory summary includes a display of at least one node summary in a review pane of the UI. The second inventory summary can include a node summary being displayed within the tree ("tree summary") adjacent to the selected node. In addition, the second inventory summary can include the node summaries for the selected node and its ancestors being displayed in the review pane. In one example, the second inventory summary can also include the node summaries for each of the ancestor nodes being displayed in locations adjacent to each of the ancestor nodes.

FIG. 2 illustrates example stages for visualizing an inventory of data entities, showing interactions between various system components. At stage 210, the UI can receive a selection of a management server for which cost or utilization information is desired. In one example, the UI may be associated with software with access to information from management servers for one or more enterprises. In another example, the UI can be part of a package of tools associated with one management server and made available to an administrator for managing an infrastructure of one enterprise. Any of these management servers can run one or more VMWARE solutions, such as VSPHERE Client, VCENTER SERVER, and VREALIZE Suite.

In one example, one or more management servers can store identifying and operational data regarding one or more servers necessary to support Mobile Device Management ("MDM") and Enterprise Mobility Management ("EMM") systems. The UI can be used by an administrator of an EMM provider to log into multiple management servers which correspond to different enterprises that are clients of the EMM provider. In one example, such a user can select a particular management server at stage 210.

In another example, the UI can be associated with software provided by a management server and used by an administrator of that management server. The operational data can be accessed from the management server when the UI is initiated as part of stage 210. In yet another example, the UI may incorporate a sign-on protocol to restrict access to specific account holders such as administrators of specific enterprises. Accounts can be associated with one or more management servers across one or more enterprises. The management server can be automatically selected based on user sign-on.

At stage 212, the inventory data service can identify an inventory of data entities for the selected management server.

At stage 214, a backend can scan various management servers or a single management server associated with the UI for operational data including infrastructure hierarchy information, VM utilization data, and storage utilization data. In addition to scanning, in stage 214, the operational data can be processed by the financial service executing on the backend to calculate cost for each inventory of data entities managed by each management server. The backend can continuously scan the management servers for the operational data and process the operational data. Together, the operational data and cost data define inventory data. At stage 216, the inventory data service executing on the backend can obtain inventory data for the inventory identified in stage 212.

In some examples, at stage 217, the UI can receive selections for a component configuration, which controls what displays in a node summary. For example, the UI can prompt a user for what cost, performance, capacity, and utilization parameters will be displayed in a visual representation of the inventory. Otherwise, a default configuration can be used. In another example, stage 217 can precede stage 216, and the inventory data service can use the component configuration to limit retrieval of inventory data from the backend.

At stage 218, the inventory data service can convert the inventory data into a format file. In one example, the inventory data service uses an algorithm to create groups of records from the raw inventory data. Each group can correspond to a data entity that will be represented by a node in a tree created from the format file. Records for each group can include components and values that will make up a node summary for a respective data entity. Each group can include the same set of components. The groups can be stored in the format file that is used to generate the tree.

The inventory data may indicate which data entities support other data entities. The algorithm can structure the groups within the format file to reflect parent child relationships between the data entities. In one example, the algorithm can create the groups (i.e., nodes) in a bottom up manner. More specifically, the algorithm can create components and component values for data entities in the lowest level of the tree first, and work its way to the highest level, the root node. An exemplary algorithm of this type can be illustrated with the following pseudo code:

```
cost_of_private_cloud [management server] = 0
for each data_center in private_cloud:
    cost_of_data_center = 0
    for each cluster in data_center:
        cost_of_cluster = 0
        for each server in cluster:
            cost_of_server = 0
```

```
            for each vm in server:
                cost_of_vm = findVmCostFromItsUtilization(vm)
                makeRecord(cost_of_vm)
                cost_of_server += cost_of_vm
            makeRecord(cost_of_server)
            cost_of_cluster += cost_of_server
        makeRecord(cost_of_cluster)
        cost_of_data_center += cost_of_cluster
    makeRecord(cost_of_data_center)
    cost_of_private_cloud += cost_of_data_center
makeRecord(cost_of_private_cloud)
```

The exemplary algorithm can produce groups corresponding to VMs, servers, clusters, data centers, and a management server, in that order. Each data entity type, as nested above, represents a level in a hierarchy of a respective infrastructure. In practice, the algorithm can complete all the groups on the VM-level first, and then proceed to completing all the groups in each successive level. Each group can have one record corresponding to a component for total cost. Accordingly, a tree deriving from the exemplary algorithm can include a tree of nodes, each node having a node summary including a total cost for data entity it represents.

In one example, the algorithm can calculate values of cost components based on data entity type, which can correspond to a cost-driving level in a tree for a particular cost component. The algorithm can use the component value for a data entity at the cost driving level, to calculate values for the component for data entities in higher or lower levels. In the algorithm above, a cost component is driven by a cost of the VMs which is obtained from the inventory data. Accordingly, a total cost value for data entities other than VMs is calculated by the algorithm according to a bottom up accrual method. A total cost for a data entity other than a VM can be a sum of total costs for data entities it supports. In another example, a server level could drive a hardware cost. For every VM a server supports, the algorithm can calculate a cost for hardware according to a top down distribution method. A hardware cost for a VM can be the hardware cost of the server that supports it, divided by a number of VMs the server supports. In contrast, a hardware cost for a cluster can be calculated by the bottom up accrual method using the hardware costs of the servers it supports. A cost component may be driven on multiple levels and an algorithm according to the present disclosure can account for such cost flows.

In one example, the format file includes serial nested groups of records. Each group may correspond to a data entity of the inventory and be nested within a group for a respective parent data entity that supports the data entity of the nested group. Each group can include component values for a cost, utilization, allocation, or performance-related parameter that is tracked or computed by the financial or inventory data services. The components can include a status of a data entity indicating if the data entity is active, idle, or has been removed. In another example, the components can include total cost and costs for CPU, memory, storage, labor, and licensing. In one example, a parent node can have a status of a majority of its children nodes. Further, the components can include a cost flow component for one or more of the cost components indicating what hierarchical level(s) drive particular costs. In one example, the format file generated is a JSON file. An example of a format file follows:

```
{ "total": 229,
"name": "MS1",
"license": 91,
"status": "active",
"storage": 100,
"vms": 2,
"children": [
        { "total": 229,
        "name": "DC1",
        "license": 91,
        "license cost direction": "down",
        "status": "active",
        "storage": 100,
        "vms": 2,
        "children": [
                { "total": 229,
                "name": "C1",
                "license": 91,
                "license cost direction": "down",
                "status": "active",
                "storage": 100,
                "vms": 2,
                "children": [
                        { "total": 229,
                        "name": "S1",
                        "license": 91,
                        "license cost direction": "down",
                        "status": "active",
                        "storage": 100,
                        "vms": 2,
                        "children": [
                                { "name": "VM1",
                                "license": 45,
                                "license cost direction": "down",
                                "status": "active",
                                "storage": 49,
                                "labor": 20,
                                "labor cost direction": "up",
                                "memory": 20,
                                "total": 123,
                                "vms": 1,
                                "cpu": 22 }
                                { "name": "VM2",
                                "license": 46,
                                "license cost direction": "down",
                                "status": "active",
                                "storage": 51,
                                "labor": 20,
                                "labor cost direction": "up",
                                "memory": 29,
                                "total": 126,
                                "vms": 1,
                                "cpu": 24 }
                                ],
                        "memory": 49,
                        "labor": 40,
                        "labor cost direction": "up",
                        "cpu": 46 }
                        ],
                "memory": 49,
                "labor": 40,
                "labor cost direction": "up",
                "cpu": 46 }
                ],
        "memory": 49,
        "labor": 40,
        "labor cost direction": "left",
        "cpu": 46 }
        ],
"memory": 49,
"labor": 40,
"labor cost direction": "down",
"cpu": 46 }
```

Values for the cost components can be computed by the financial or inventory data services. On the other hand, values associated with cost flow components may be provided through the inventory data service and include designations that indicate a source of a particular cost relative to a given data entity. In one example, values for a cost flow component can be pre-set in an algorithm for the inventory data service for specified levels of an infrastructure. In another example, the inventory data service may recognize how cost values are distributed or accrued between levels of the infrastructure and set values of cost flow components accordingly.

An infrastructure including VMs supported by servers grouped into clusters can be used to illustrate a cost flow component. Licensing costs may only be incurred on a VM-level, therefore a licensing cost for a server can be a sum of the licensing costs for the VMs it supports. The group of VMs occupy a "lower" hierarchical level than the servers, and the license cost for the supporting server can be described as coming from the lower level. As a result, a licensing cost flow component for the server may have a value in the format file of "down" or an arrow pointing down to indicate a respective cost is coming from the VMs.

At stage 220, the inventory data service can create a tree of nodes that models a hierarchy of an infrastructure encompassing the inventory of data entities. The inventory data service can include a framework that is developed on top of a library of pre-written scripts. The inventory data service can apply the format file to the framework in stage 220 and create the tree as a graphical representation of the complete inventory. Each node of the tree can correspond to a data entity from the inventory. Further, the framework can graphically encapsulate various cost drivers and cost components for the data entities in node summaries. A node summary can be associated with each node and include the components in the format file. In addition, the node summary can include indicators for values of the cost flow components in the format file. The inventory data service can send the tree and node summaries to the UI in stage 222.

At stage 224, a first view of the inventory can be configured from the tree and displayed in the UI. The UI can configure the first view according to settings provided by a user through the UI or pre-set by the data inventory data service. The first view includes the hierarchical view and the first inventory summary. In one example, the hierarchical view includes, at minimum, a portion of the tree including a root node. The root node corresponds to data entity that manages the inventory of data entities represented by the tree. Depending on the number of levels of the hierarchy for the inventory, the root node may correspond to a server, a data cluster, a data center, or a management server. In one example the hierarchical view includes only the root node. In another example, a root node and one or more descendent nodes are displayed. In another example, the hierarchical view can include the root node and all of the descendant nodes in each level for a pre-set number of levels.

In stage 226, the UI can receive the first node selection type to expand a selected node and display its children nodes. The selection can be a click or double click on the node, in an example. In response to the first type of node selection, the UI can display information about data entities supported by the selected node.

In stage 228, the inventory data service receives the node selection from the UI and accesses a portion of the tree including the children nodes of the selected node. In stage 230, the inventory data service transmits the portion of the tree including the children nodes and respective node summaries to the UI for display. In stage 232, the UI interface can display an updated hierarchical view of the inventory as a result of receiving the portion of the tree. In another example, the full tree is provided to the UI at stage 222, and the selection simply causes the UI to access and display a different portion of the tree without further assistance from the inventory data service.

The UI can expand a group of children nodes from the selected node. The children nodes can expand to a different level than the selected node to represent data entities directly supported by the data entity of the selected node. The level for the children nodes can be unpopulated, or include nodes corresponding to data entities supported by data entities on the same level as the selected node. Repeating the first node selection type for all nodes having children and being displayed in successive updated hierarchical views can cause the UI to reveal an entire tree for the inventory. Thus, the inventory data service and the UI can provide a visual representation of the entire inventory that models infrastructural relationships between all the data entities in the inventory. In one example, execution of the first type of node selection can result in a change of the first inventory summary provided in the review pane. The review pane can be populated with node summaries for the selected node and its ancestors.

In stage 234, the UI can receive the second type of node selection for a node displayed in the first view. In one example, the node selection can be performed by hovering a pointer over a particular node. An identifier for the selected node can be sent to the inventory data service at stage 234. At stage 236, the inventory data service looks up the identifier in the tree and retrieves or identifies a node summary for the selected node, and node summaries for the selected node's ancestors. Information including or identifying the node summaries is transmitted to the UI in at stage 238. In stage 240, the UI can display a second inventory summary as a result of receiving the information from the inventory data service.

To this point in the sequence, the first inventory summary may have been displayed with the review pane of the UI. The first inventory summary includes the node summary for at least the root node provided in the review pane of the UI. The second inventory summary can include node summaries for the selected node and each of its ancestors displayed in the tree next to respective nodes ("tree summaries"). Each tree summary can be a tooltip with component names and values for a data entity. The review pane can be populated with review pane summaries, which are node summaries for the same nodes in the second inventory summary.

A display of the second inventory summary can be illustrated with reference to an inventory including a management server, data centers, clusters, servers, and VMs. A first view of the inventory can include a hierarchical view that extends to the clusters. A cluster node can be selected via the second type of node selection. Tree summaries for the selected cluster node, a node for a data center that supports the cluster, and the root node can be displayed in the tree in the UI. The review pane can include node summaries for these same nodes. In one example, hovering a cursor over the data center node for the cluster causes removal of the tree and review pane summaries for the cluster node. If a different data center node is selected, stages 234 to 240 can be performed for the newly selected node. A first sub-process including stages 226 to 232 can be performed before or after a second sub-process including stages 234 to 240. These sub-processes can be performed repeatedly in various orders.

FIG. 3 provides a detailed sequence diagram for using a UI to search for a data entity and obtain respective cost or utilization data. In stage 312, a search query for a data entity can be received through the UI. The UI can include a text field where the search query can be entered. In one example, identifiers ("IDs") for each data entity included in the inventory data can be assigned by a management server or the inventory data service according to a pre-defined naming convention or named individually by an administrator. The search query can include an exact or partial match to IDs in the inventory. At stage 314, the inventory data service can compare the search query to a list of IDs for the data entities in an inventory to find a match or partial matches. The inventory data service can identify the data entity or data entities that include input for the search query in their IDs and send the search results to the UI in stage 316.

At stage 318, the UI displays the selectable search results. In one example, each search result can be displayed as a string of IDs that includes the ID or partial ID of the searched-for data entity, and the IDs of respective supporting data entities. The IDs can be arranged in reverse ancestral order with the ID or partial ID of the searched-for entity at the beginning of the string. Each search result can be selected by a user of the UI. In one example, the IDs can include a data entity type and a number. The number can correspond to a number in an order in which the data entity was added to the inventory or assigned an ID by the inventory data service.

A search query that includes a data type and a number can result in the inventory data service returning a single search result. In another example, the number in the search query could equate to a truncation of a number in multiple IDs, and multiple search results can be returned. In addition, the inventory data service can recognize a correspondence between names of data entity types and known or preset abbreviations. As a result, a search query including only a name or abbreviation for a particular data entity type could be a partial match for several data entity IDs. For example, a search query for "S 21", "server 21", or "ser 21" can result in a selectable search result expressed as "Server 21 --- Cluster 4 --- Data Center 2 --- Management Server 1" or "S21 --- C4 --- DC2 --- MS1." On the other hand, a search query for "server 2" can yield a list of search results each including "Server 2_" where "_" is blank or a number 0 to 9.

At stage 320, the UI receives a selection of a search result, which is transmitted to the inventory data service. At stage 322, the inventory data service accesses a portion of the tree including the data entity for the selected search result. At stage 324, the inventory data service sends an isolated portion of the tree including the selected data entity to the UI. The isolated portion of the tree includes a node for the selected data entity and its respective ancestor nodes.

Stage 326 can include the UI displaying a second view of the inventory including an isolated view of the tree and the first inventory summary. The isolated view can include a single line of linked nodes including the root node at one end and a node for the selected data entity at an opposite end (end node). The nodes can be arranged according to the ancestral (parent-child) order for their corresponding data entities. The first inventory summary can include node summaries in the review pane for each of the nodes displayed in the isolated view.

At stage 328, a node selection of the first or second type can be received by the UI and information regarding the selected node and the node selection type can be transmitted to the inventory data service. At stage 330, the inventory data service can process the node selection type and determine what additional details from the tree can or need to be provided. In response the first selection type, the inventory data service can determine if the selected node is an end node and is a parent to other data entities. In response to the second selection type, the inventory data service can determine whether additional detail from the tree is or is not required.

At stage 332, the inventory data service can transmit additional details with respect to the tree and the UI can display an updated second view in stage 334. Where the selected node has children nodes and was the end node, the additional details can include a portion of the tree including children nodes. The UI can expand the selected node and display the children nodes. Each of the children nodes that includes children nodes can be expanded through a subsequent first type of node selection. If the selected node is not the end node or has no children nodes, the additional details can include a message that the node cannot be expanded.

In another example, the second node selection type can be performed on the end node, or any other of the nodes displayed in the second view. The additional details transmitted in stage 332 can be an instruction to display the second inventory summary. As a result, UI can display the tree summaries for the selected node and any respective ancestor nodes in stage 334. In addition, where the selected node is not the end node the review pane can be updated to include just the node summaries of the selected node and its ancestor nodes.

In another example, the UI receives a full tree from the inventory data service. The UI can then display and hide portions of the tree based on user selections rather than re-querying the inventory data service based on each UI selection. In still another example, the inventory data service provides a partial tree that includes more information than is currently displayed at the UI. The UI can expand the tree until it reaches a portion where more information is needed, at which time it can query the inventory data service.

FIG. 4 provides an illustration of an example system for performing the methods of FIGS. 1-4. The system can include one or more management servers 400 that can each provide centralized management of and operational data gathering from a respective infrastructure of data entities. Each management server 400 can be a single server or a network of servers. Each management server 400 can utilize one or more processors and memory stores. Each management server 400 can provide an administrator with tools to manage an infrastructure. For example, any of the management servers 400 can run one or more VMWARE solutions, such as VSPHERE Client, VCENTER SERVER, and VREALIZE Suite.

Each management server 400 can store various types of operational information associated with data entities it manages. Operational information that can be stored can include names and locations of data entities, physical hardware, current and historical loads, installed software, the number of VMs running on each data entity, OS type, OS license type, other physical or virtual components, and hierarchical positions within an infrastructure.

The system of FIG. 4 can include a system backend 410. The system backend 410 can be one or more servers that execute a financial service 420 and an inventory data service 430. The financial service 420 and the inventory data service 430 can be part of a software product that is at least partially provided by the backend. The software product can provide data center management tools, optimization and analysis tools, workload cost comparison, consumption tracking and analysis, and any other relevant features. In some examples, the software including the financial service 420 and the inventory data service 430 can provide optimization and analysis tools such as cloud cost tracking, current and planned workload cost comparison, and consumption tracking and analysis across business groups, applications, and services.

In addition to the financial service 420 and the inventory data service 430, the backend 410 can provide a user interface 440 associated with the system. The user interface 440 is at least associated with the inventory data service 430 and configured to provide a visual representation of any of the inventories managed by the management servers 400. In one example, the user interface 440 can be associated with the financial service 420 in addition to the inventory data service 430. An example software product for the financial service 420 associated with the user interface 440 is VMWARE's VREALIZE Business for Cloud, although any other suitable software can be used. An example user interface 440 is provided in FIGS. 5A-8B.

FIGS. 5A and 5B provide illustrations of an exemplary UI 500 displaying a first view 502 of an infrastructures inventory of data entities. Turning to FIG. 5A, the first view 502 of the UI 500 includes a hierarchical view 510 of the inventory and a first inventory summary 520. The hierarchical view 510 includes a portion of a tree 512 constructed for the inventory including a root node 514. Each node of the tree 512 that is displayed in the hierarchical view 510 can include an ID 516 and a status indicator 518. The ID 516 corresponds to a name or other identifier assigned to a data entity for a given node. The status indicator 518 indicates whether the data entity is active, idle, or has been deleted from the inventory. In one example, a legend 517 can be provided in the UI 500 that defines an indicator for each status. A portion of the tree 512 provided with the hierarchical view 510 can include one or more levels of an infrastructure. In FIG. 5A, a single node 519, representing a single level of an infrastructure, is displayed. The node 519 is the root node 514 for the tree 512 as it corresponds to a management server 400 ("MS1") of FIG. 4. As previously noted, when the UI 500 is accessed a particular management server 400 can be selected for display depending on administrative permissions granted to a particular user of the UI 500. The number of levels displayed in the first view 502 can be adjusted by a user in a preferences module of the UI 500.

The first inventory summary 520 is displayed in a review pane 522 in the UI 500. The review pane 522 can include a review pane version of a node summary ("review pane summary 524") for nodes currently displayed in the UI 500. Each review pane summary 524 can include a component configuration 526 that displays tracked parameters for data entities in the inventory. The component configuration 526 can include statistical components 530 and cost flow components 540.

The statistical components 530 can include some combination of cost, performance, utilization, or other parameter tracked by the financial service 410. As shown in FIG. 5A, the statistical components 530 can include several performance components 532 that inform on the status and number of VMs managed by a data entity. The statistical components 530 further include cost components 534 such a total cost for the data entity, and sub-costs such as labor and license costs. One or more of the cost components 534 can be accompanied by one of the cost flow components 540.

For example, labor and license flow components 542, 544 can be represented by an arrow that points up, down, or towards a respective cost component. In FIG. 5A, the labor and license flow components 542, 544 are both down arrows indicating these costs originate from one or more data entities on a lower level of a hierarchy. In this way, the first view 502 provides a user with a visual representation for the source of different costs within an infrastructure.

Nodes such as the root node 514 can be selected in one or more ways with a pointer 560. In FIG. 5B, the first view 502 of the inventory is displayed after the root node 514 has been selected according to a first type of node selection. An updated hierarchical view 510 of the tree 512 is displayed along with the first inventory summary 520. Children nodes 562 have been expanded in the tree 512 from the root node 514 and correspond to data center data entities that are directly supported and managed by the Management Server MS1. Accordingly, two levels of the tree 512 are now displayed.

A link 570 is provided between the root node 514 and the children nodes 562. The link 570 can include a trunk portion 572 and edges 574. Each child node 562 can be linked to the trunk 572 by a respective edge 574. Edges 574 for a given link can be different in appearance to reflect a difference in values within a group of children nodes for a parameter included as a component in the node summaries. As illustrated in FIG. 5B, edge 574A links data entity DC1 to the trunk 572 and has a thickness that is greater than a thickness of edge 574B, which links data entity DC4 to the trunk. In one example, the difference in thickness can reflect that data entity DC1 has a higher total cost than data entity DC4.

The first inventory view 520 is also included in the UI 500 illustrated in FIG. 5B. In particular, the review pane 522 includes the node summary 524 for the root node 514. In one example, the review pane 522 continues to display a node summary for a node that has been selected by first node selection type since that node has in fact been selected. In another example, the first inventory summary 520 can be updated show a node summary for children node 562 meeting criteria for cost or resource utilization set by an administrator.

FIGS. 6A and 6B provide illustrations of the exemplary UI 500 displaying a second inventory summary within the first view 510 of the inventory. In FIG. 6A, the tree 512 has been expanded to display several parent child relationships and the five levels of the infrastructure managed by Management Server MS1. The first level 610 includes the Management Server MS1, the second level 612 includes data centers, the third level 614 includes clusters, the fourth level 616 includes servers, and the fifth level 618 includes VMs. The portion of the tree 512 displayed in the hierarchical view 510 illustrated in FIG. 6A can be provided through a series of node selections of the first type.

However, the first view 502 of FIG. 6A illustrates the result of selecting a node according to the second type of node selection. In particular, the pointer 560 is shown hovering over a node 620 for a Server S31. In response, a second inventory summary 630 is displayed in the UI 500. The second inventory summary 630 includes review pane summaries 534 and tree summaries 632 for the node 620 selected and its ancestor nodes corresponding to Cluster C7, Data Center D4, and Management Server MS1.

The second inventory view 630 provides a user with the ability to view a node summary for one data entity in isolation with the tree summaries 632. Additionally, the user can use the review pane 522 to view a node summary for a selected data entity in the context of a line of supporting and supported data entities. Accordingly, the user can glean how one data entity contributes to a tracked parameter for a supporting entity in a single look at the review pane 522.

In one example, the tree summaries 632 can include the same component configuration as the review pane summaries 524, with the exception of a name or ID for a data entity.

In another example, component configurations for the review pane and tree summaries 524, 632 can be different as configured by a user of the UI 500.

As shown FIG. 6A, all of the node summaries include cost flow components for labor and license cost components. Being able to see cost flow component for each data entity in a line of data entities allows a user to identify the hierarchical level in an infrastructure from which a particular cost is driven. With respect to labor cost, a labor flow component 640 for the Management Server MS1 points downward. In one example, this can mean that labor cost originates from a level in the infrastructure with data entities supported by the Management Server MS1. Another way to say this is the cost originates a lower level and is pushed up to Management Server MS1. In terms of distribution of cost, the down arrow indicates that a bottom up accrual method is used to determine the labor cost for the Management Server MS1 and is equal to a sum of labor costs of the data entities it immediately supports, the data centers.

On the other hand, the labor flow components 642, 644 for the Server S31 and Cluster C7 point upwards in FIG. 6A, meaning the source of this cost relative to those data entities originates from a higher level in the infrastructure and is pushed down. In terms of distribution of cost, the up arrow means a top down distribution method is used to determine the labor cost for these data entities. As such, the labor cost for Server S31 is equal to the labor cost of its parent, Cluster C7, divided by the number servers that Cluster C7 supports. In contrast, a labor flow component 646 for Data Center D4 points toward the labor cost value. Accordingly, the tree and review pane summaries 524, 632 indicates a labor cost for Data Center D4 originates at this data entity. Further, the combination of values for the cost flow components 640-646 indicates Data Center D4 is the source of cost for this component for the Management Server MS1 that supports it, as well as Cluster C7 and Server 31 which it supports.

Turning to FIG. 6B, the pointer 560 has been moved and is now shown as hovering over a node 670 for virtual machine VM151. In response, the UI 500 has updated the second inventory view 630 so that a tree summary 632 is displayed next to the node for VM151, and a review pane summary 524 for VM151 is included in the review pane 522. The review pane 522 therefore displays the node summary for VM151 and the node summaries of its ancestors. Like the review pane summary for Server 31 in FIG. 6A, the review pane summary 524 for VM151 is positioned in a first position 650 in the review pane 522. In one example, a node summary for the first position 650 in the review pane 522 can be a node summary for whichever node was most recently selected through the first or second selection type.

As shown in FIG. 6B, a status indicator 682 for a node 680 for server S1 indicates the data entity is idle. Further, a group of nodes 684 for the children of node 680 indicate that data entities VM1, VM2, and VM4 are idle, data entity VM3 is active, and data entity VM5 has been deleted. In one example, the inventory data service 430 can determine the status of a data entity according to the status of the data entities it supports, if any. In one example, a status of a data entity that supports other data entities can be set by the inventory data service or the UI. The status can be derived based on a majority of the supported data entities. As is the case for server S1, a majority of the VMs it supports have an idle status resulting in its status indicator 682 showing Server S1 as being idle. In one example, the user can expand the tree 512 beneath Server S1 to see statuses for individual VMs.

In another example, the status indicator for any data entity that supports other data entities can be set to active if even one supported data entity is active. Further, if no supported data entities are active, the status for the supporting data entity can be set to either idle or deleted based on a status of a majority of supported data entities. In yet another example, a status indicator for a supporting data entity can be set to deleted only where all the data entities it had been supporting were deleted.

FIG. 7 provides an illustration of the exemplary UI 500 in which a directed entity search has been executed, and a searched for entity and its ancestors are displayed. The UI 500 can include a search field 700 in which an ID or partial ID for a data entity can be entered. In the case of FIG. 7, a search query for "VM103" has been entered. Unless an inventory visualized in the UI 500 includes more than one server with an ID that includes 103, this type of search query can return a single result. In another example, a search query can include quotation marks or other characters that can limit a search to a single data entity.

As shown in FIG. 7, the UI 500 has displayed a second view 710 of the inventory including an isolated view 712 of the tree 512 and the first inventory summary 520 in the review pane 522. The isolated view 712 includes a node 713 for the searched-for data entity as an end node 714, its intermediate ancestor nodes 716, and the root node 514. More specifically, an initial isolated view 710 is a line of nodes that only includes parent-child relationships that link a node for the searched-for data entity to a root node of a tree for the inventory.

In one example, the first inventory summary 520 in the second view 710 includes a review pane summary 632 for the searched-for entity in the first position 650 in the review pane 522. Review pane summaries for the supporting data entities can also be displayed as shown in FIG. 7. However, if the second type of node selection is used to select one of the nodes in the isolated view 712 that is not the end node 714, the UI 500 can display the second inventory summary 620 and change the review pane 522. More specifically, tree summaries for the selected node and its ancestor nodes can be displayed, and the review pane summary for the selected node can be displayed in the first position 650.

FIG. 7 illustrates an isolated view for a VM which occupies a final level of the infrastructure hierarchy of the displayed inventory. However, data entities in higher levels of a hierarchy can be searched for and displayed. Nodes for such data entities can be selected in the isolated view 712 according to the first and second type of node selections and result in the same display updates by the UI 500 described with respect to FIGS. 5B and 6B.

FIGS. 8A and 8B provide illustrations of the exemplary UI 500 before and after execution of a menu-based entity search. Turning to FIG. 8A, the first view 510 of the inventory is displayed and a search query 800 is entered in the search field 700. In one example, the inventory data service 420 has compared the search query to a list of IDs for the tree and determined there is a match and several partial matches between the IDs and the search query. As a result, the inventory data service 420 has returned the search results to the UI 500. FIG. 8A illustrates a response of the UI 500 to receiving the search results, which includes displaying a list 810 of search results 812 below the search field 700. Each search result 812 can include the ID of the matching or partially matching node at the beginning of a string 814. The string can further include the IDs of the ancestor nodes for the node at the beginning of the string 814. Any of the search results 812 can be selected by a user through the UI 500.

Turning to FIG. 8B, the second view 710 is displayed in the UI 500. The search field 700 includes an ID for a data entity for a selected data entity 820. The second view 710 includes the isolated view 712 for the selected data entity 820, and the first inventory summary 520. A review pane summary 524 for the selected data entity 820 is displayed in the first position 650 of the review pane 522. In the isolated view 710, a node 824 for the selected data entity 820 is displayed as the end node 714 in a string that can include intermediate ancestor nodes 716 and the root node 512.

As illustrated in FIG. 8B, the menu-based search can return an isolated view for a data entity that is not part of a lowest level of the infrastructure's hierarchy. As is the case for the directed search, the node 824 can be selected according to the first type of node selection. Thus, children nodes, if there be any, for data entities supported by the selected data entity 820, can subsequently expand from the node 824.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for visualizing an infrastructure of a computing system, comprising:
   converting cost and utilization data for data entities of the infrastructure into a format file;
   from the format file, creating a tree structure of nodes that correspond to the data entities;
   from the format file, populating node summaries that correspond to the data entities with associated cost and utilization data;
   displaying in a user interface, a first view of the infrastructure, including:
      a hierarchical view of the tree structure; and
      a first node summary including at least one of cost and utilization data for a first data entity;
   receiving a selection of a first node corresponding to the first data entity and displayed in the hierarchical view; and
   displaying at least one of an updated hierarchical view and a second node summary, according to a node selection type,
   wherein the first node summary is displayed in a review pane of the user interface,
   wherein the first node summary includes cost values for cost components included in the format file for the first data entity, the cost components including a total cost and at least one sub-cost associated with the first data entity, and
   wherein the cost values for the cost components are determined by summing values for data entities supported by the first data entity.

2. The method of claim 1, wherein the tree structure defines an arrangement of nodes corresponding to a hierarchy of corresponding data entities within the infrastructure, wherein the hierarchical view includes a first portion of the tree structure including the first node and the updated hierarchical view includes a second portion of the tree structure different than the first portion, wherein the second portion includes children nodes expanded from the first node, and wherein the children nodes correspond to data entities supported by the first data entity.

3. The method of claim 1, wherein receiving the selection includes receiving a first selection type for accessing nodes, and wherein the user interface displays the updated hierarchical view in response to receiving the first selection type.

4. The method of claim 1, wherein displaying the second node summary comprises the stages of:
   displaying the second node summary in a location adjacent to the first node;
   displaying node summaries for ancestor nodes of the first node, the ancestor nodes corresponding to data entities that support the first data entity; and
   displaying the second node summary and the node summaries additionally in the review pane.

5. The method of claim 1, wherein receiving the selection includes receiving a second selection type based on hovering over the first node, and wherein the user interface displays the updated hierarchical view in response to receiving the second selection type.

6. The method of claim 1, wherein the first node summary includes a cost flow component with an indicator pointing in a direction, wherein the direction indicates the cost components are one of pushed down from a supporting data entity, pushed up from a supported data entity, and originating from the first data entity.

7. The method of claim 1, further comprising the stages of:
   receiving a search query in a search field of the user interface;
   comparing the search query to a list of identifiers for the data entities of the infrastructure;
   displaying at least one identifier that is one of a match and a partial match in a list of search results to the search query;
   receiving a selection of the one of the search results; and
   displaying a second view of the infrastructure including an isolated view of the tree structure,
   wherein the isolated view includes a second node, for a second data entity corresponding to the selected search result, displayed as an end node extending from ancestor nodes.

8. A non-transitory, computer-readable medium comprising instructions that, when executed by a processor, perform stages for visualizing an infrastructure of a computing system, the stages comprising:
   converting cost and utilization data for data entities of the infrastructure into a format file;
   from the format file, creating a tree structure of nodes that correspond to the data entities;
   from the format file, populating node summaries that correspond to the data entities with associated cost and utilization data;
   displaying in a user interface, a first view of the infrastructure, including:
      a hierarchical view of the tree structure; and
      a first node summary including at least one of cost and utilization data for a first data entity;

receiving a selection of a first node corresponding to the first data entity and displayed in the hierarchical view; and displaying at least one of an updated hierarchical view and a second node summary, according to a node selection type, wherein the first node summary is displayed in a review pane of the user interface, wherein the first node summary includes cost values for cost components included in the format file for the first data entity, the cost components including a total cost and at least one sub-cost associated with the first data entity, and wherein the cost values for the cost components are determined by summing values for data entities supported by the first data entity.

9. The non-transitory, computer-readable medium of claim 8, wherein the tree structure defines an arrangement of nodes corresponding to a hierarchy of corresponding data entities within the infrastructure, wherein the hierarchical view includes a first portion of the tree structure including the first node and the updated hierarchical view includes a second portion of the tree structure different than the first portion, wherein the second portion includes children nodes expanded from the first node, and wherein the children nodes correspond to data entities supported by the first data entity.

10. The non-transitory, computer-readable medium of claim 8, wherein displaying the second node summary comprises the stages of:
    displaying the second node summary in a location adjacent to the the first node;
    displaying node summaries for ancestor nodes of the first node, the ancestor nodes corresponding to data entities that support the first data entity; and
    displaying the second node summary and the node summaries additionally in the review pane.

11. The non-transitory, computer-readable medium of claim 8, wherein the first node summary includes a cost flow component with an indicator pointing in a direction, wherein the direction indicates the cost components are one of pushed down from a supporting data entity, pushed up from a supported data entity, and originating from the first data entity.

12. The non-transitory, computer-readable medium of claim 8, the stages further comprising:
    receiving a search query in a search field of the user interface;
    comparing the search query to a list of identifiers for the data entities of the infrastructure;
    displaying at least one identifier that is one of a match and a partial match in a list of search results to the search query;
    receiving a selection of the one of the search results; and
    displaying a second view of the infrastructure including an isolated view of the tree structure;
    wherein the isolated view includes a second node, for a second data entity corresponding to the selected search result, displayed as an end node extending from ancestor nodes.

13. A system for visualizing infrastructure of a computing system, comprising:
    a memory storage including a non-transitory, computer-readable medium comprising instructions; and
    a backend including a processor that executes the instructions to carry out stages comprising:
        converting cost and utilization data for data entities of the infrastructure into a format file;
        from the format file, creating a tree structure of nodes that correspond to the data entities;
        from the format file, populating node summaries that correspond to the data entities with associated cost and utilization data;
        displaying in a user interface, a first view of the infrastructure, including:
            a hierarchical view of the tree structure; and
            a first node summary including at least one of cost and utilization data for a first data entity;
        receiving a selection of a first node corresponding to the first data entity and displayed in the hierarchical view; and
        displaying at least one of an updated hierarchical view and a second node summary, according to a node selection type,
        wherein the first node summary is displayed in a review pane of the user interface,
        wherein the first node summary includes cost values for cost components included in the format file for the first data entity, the cost components including a total cost and at least one sub-cost associated with the first data entity, and
        wherein the cost values for the cost components are determined by summing values for data entities supported by the first data entity.

14. The system of claim 13, wherein the tree structure defines an arrangement of nodes corresponding to a hierarchy of corresponding data entities within the infrastructure, wherein the hierarchical view includes a first portion of the tree structure including the first node and the updated hierarchical view includes a second portion of the tree structure different than the first portion, wherein the second portion includes children nodes expanded from the first node, and wherein the children nodes correspond to data entities supported by the first data entity.

15. The system of claim 13, wherein displaying the second inventory summary comprises the stages of:
    displaying the second node summary in a location adjacent to the first node;
    displaying node summaries for ancestor nodes of the first node, the ancestor nodes corresponding to data entities that support the first data entity; and
    displaying the second node summary and the node summaries additionally in the review pane.

16. The system of claim 13, wherein the first node summary includes a cost flow component with an indicator pointing in a direction, wherein the direction indicates the cost components are one of pushed down from a supporting data entity, pushed up from a supported data entity, and originating from the first data entity.

17. The system of claim 13, the stages further comprising:
    receiving a search query in a search field of the user interface;
    comparing the search query to a list of identifiers for the data entities of the infrastructure;
    displaying at least one identifier that is one of a match and a partial match in a list of search results to the search query;
    receiving a selection of the one of the search results; and
    displaying a second view of the infrastructure including an isolated view of the tree structure;

wherein the isolated view includes a second node, for a second data entity corresponding to the selected search result, displayed as an end node extending from ancestor nodes.

* * * * *